(12) United States Patent
Han

(10) Patent No.: US 6,591,118 B1
(45) Date of Patent: Jul. 8, 2003

(54) METHOD FOR SWITCHING A MOBILE TELEPHONE FOR A TRANSMITTED/RECEIVED VOICE SIGNAL IN A SPEAKERPHONE MODE

(75) Inventor: Jung-Kun Han, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 354 days.

(21) Appl. No.: 09/621,861

(22) Filed: Jul. 18, 2000

(30) Foreign Application Priority Data

Jul. 21, 1999 (KR) .......................................... 99-29477

(51) Int. Cl.⁷ ................................................ H04B 1/38
(52) U.S. Cl. ........................ 455/570; 455/78; 370/286; 379/406.01; 379/406.04
(58) Field of Search .......................... 455/78, 99, 222, 455/232.1, 297, 550, 569, 570; 379/391, 392, 404, 406.01, 406.04, 416, 420.01, 420.02, 420.03, 444; 370/276, 286, 287, 288, 289, 296, 297; 381/57, 86, 93, 95, 96, 104, 107, 108, 110, 111

(56) References Cited

U.S. PATENT DOCUMENTS

| 4,378,603 A | 3/1983 | Eastmond | ..................... 455/79 |
|---|---|---|---|
| 5,333,176 A | 7/1994 | Burke et al. | ..................... 379/58 |
| 5,398,281 A | * 3/1995 | Kurokawa et al. | ........... 379/390 |
| 5,588,041 A | * 12/1996 | Meyer, Jr. et al. | ............ 379/59 |
| 5,787,165 A | * 7/1998 | Lilja et al. | ................... 379/390 |
| 6,138,040 A | * 10/2000 | Nicholls et al. | ............. 455/569 |
| 6,223,154 B1 | * 4/2001 | Nicholls et al. | ............. 704/233 |

FOREIGN PATENT DOCUMENTS

| GB | 2 083 979 | 3/1982 | ............. H04B/1/44 |
|---|---|---|---|
| GB | 2 237 704 | 5/1991 | ............. H04B/1/46 |
| GB | 2 271 247 | 4/1994 | ............. H04B/1/46 |

* cited by examiner

Primary Examiner—Thanh Cong Le
Assistant Examiner—James Ewart
(74) Attorney, Agent, or Firm—Dilworth & Barrese, LLP

(57) ABSTRACT

Switching a mobile telephone for selectively receiving or transmitting a voice signal in a speakerphone mode by counting the number of the full-rate voice data received from the sender, and blocking the transmission path from the receiver to prevent the received voice data from being retransmitted through the receiver's microphone to the sender if the number of the full-rate voice data exceeds a predetermined value.

10 Claims, 2 Drawing Sheets

METHOD FOR SWITCHING A MOBILE TELEPHONE FOR A TRANSMITTED/RECEIVED VOICE SIGNAL IN A SPEAKERPHONE MODE

BACKGROUND OF THE INVENTION

1. Field of the Invention

The present invention relates to a mobile telephone, and more particularly to a method for switching a mobile telephone for selectively transmitting or receiving a voice signal.

2. Description of the Related Art

Recently, a more compact sized mobile telephone, such as the folder-type mobile telephone, has been developed. These newer mobile telephones incorporate an additional function of a speakerphone mode that enables the user to conduct a voice communication without holding the mobile telephone by his ear. However, the conventional mobile telephone with such an additional function inherently suffers particular drawbacks. One of these drawbacks is that the received voice signal emanating from a speaker may unintentionally feedback through the microphone to the sender, thus causing unwanted interference. This interference, or garble, is known as a howling phenomenon. Moreover, the mobile telephone only operates in either a receive mode or transmit mode at any point in time based on the voice signal (i.e. the transmitted voice signal or the received voice signal) with the greater intensity. This limitation creates a problem in that the user cannot be assured that his voice signal input through the microphone is being transmitted to the other user. The present invention solves this longstanding problem in the present technology.

SUMMARY OF THE INVENTION

It is an object of the present invention to provide a method for switching a mobile telephone for selectively receiving or transmitting a voice signal in the speakerphone mode so as to prevent the howling phenomenon.

According to one embodiment of the present invention, a method for switching the mobile telephone for selectively receiving or transmitting a voice signal in the speakerphone mode, comprises the steps of counting the number of the full-rate voice data received from the sender, and blocking the transmission path from the receiver to prevent the received voice data from being retransmitted back through the microphone of the receiver to the sender if the number of the full-rate voice data exceeds a predetermined value.

The present invention will now be described more specifically with reference to the drawings attached only by way of example.

BRIEF DESCRIPTION OF THE ATTACHED DRAWINGS

Figure 1:
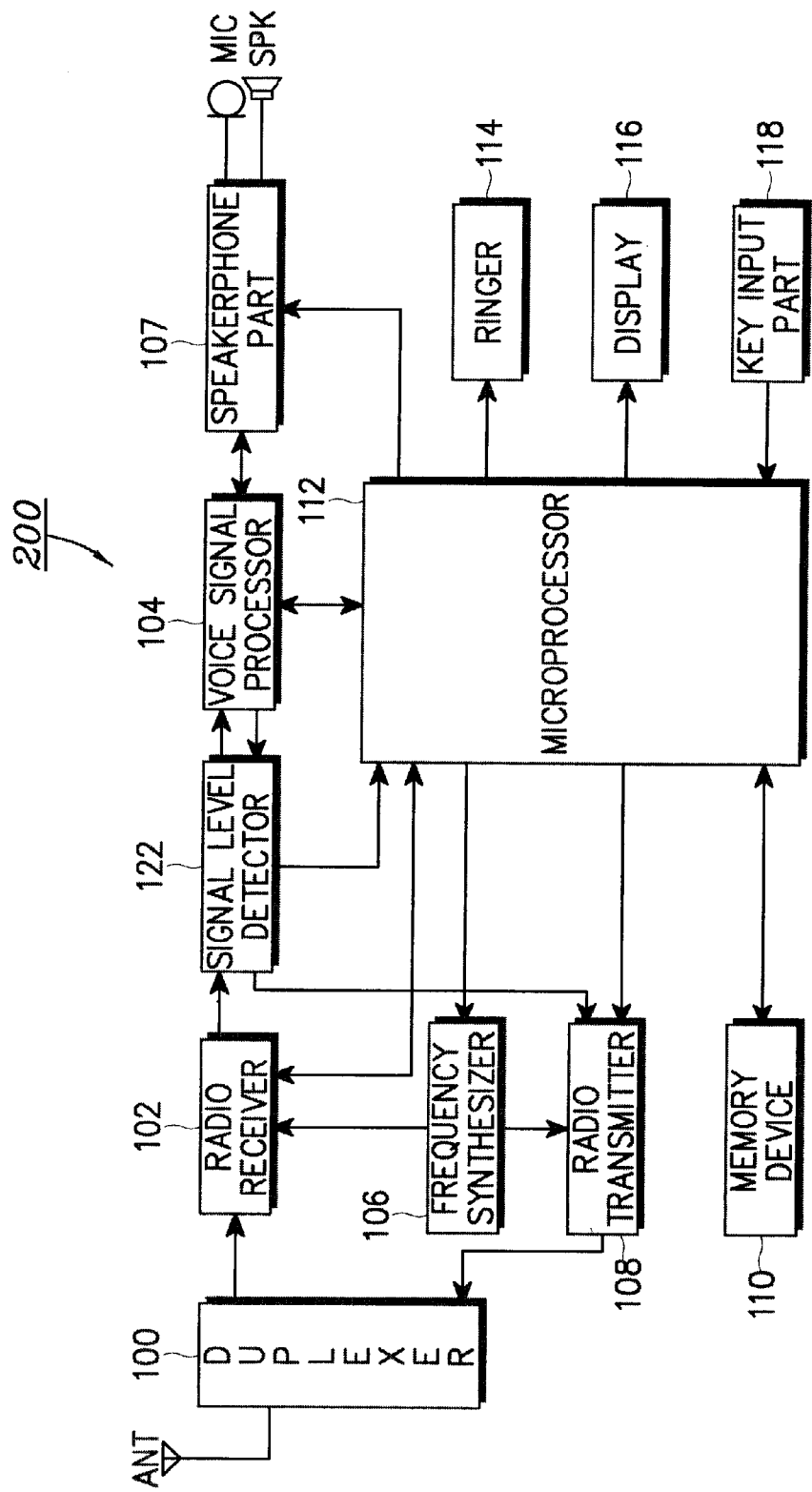
Figure 2:
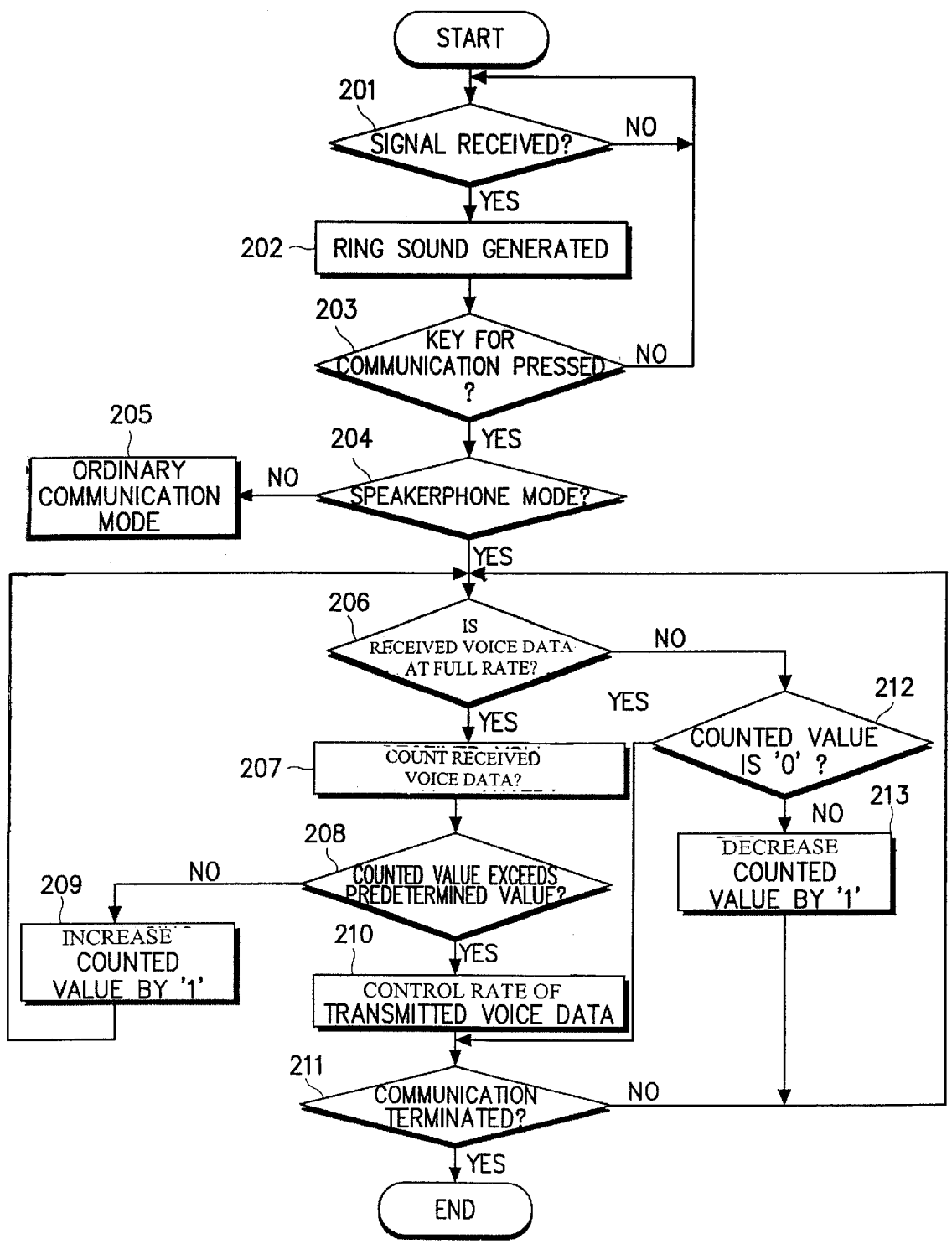

The above and other objects, features and advantages of the present invention will become more apparent from the following detailed description when taken in conjunction with the accompanying drawings in which:

FIG. 1 is a block diagram for illustrating the structure of a mobile telephone according to an embodiment of the present invention; and FIG. 2 is a flow chart for illustrating the steps of switching a mobile telephone for selectively receiving or transmitting a voice signal in the speakerphone mode according to one embodiment of the present invention.

DETAILED DESCRIPTION OF THE PREFERRED EMBODIMENT

Referring to FIG. 1, a microprocessor 112 controls the functions of the mobile telephone 200. A duplexer 100 delivers a signal received by an antenna ANT to a radio receiver 102 or transmits the signal of a radio transmitter 108 through the antenna ANT. The radio receiver 102 delivers the non-voice data to the microprocessor 112. The radio receiver 102 also delivers the voice signal to a signal level detector 122. The voice signal is then delivered to a voice signal processor 104. A frequency synthesizer 106 generates a carrier eliminator signal delivered to the microprocessor 112 to eliminate the received carrier signal corresponding to the receiving channel. The frequency synthesizer 106 also generates a transmitter carrier signal that is applied to the output signal of the radio transmitter 108. The radio transmitter 108 combines the carrier signal from the frequency synthesizer 106 and the voice signal from the voice signal processor 104, and outputs it to a duplexer 100 for transmission through the antenna ANT.

The voice signal processor 104 decodes the coded voice signal from the radio receiver 102, delivers it through a speakerphone part 107, and outputs it to a speaker SPK. The voice signal processor 104 also encodes the voice signal delivered from the microphone MIC through the speakerphone part 107, and ultimately to the radio transmitter 108. A signal level detector 122 detects the levels of the received and transmitted voice signals delivered to the microprocessor 112. A ringer 114 generates a ringing sound when a ring signal is received. A memory device 110 includes a ROM for storing a control program of the microprocessor 112, a non-volatile memory for storing a plurality of names and associated telephone numbers, and a RAM for temporarily storing data generated when operating the mobile telephone. A key input part 118 includes various functional keys for establishing and terminating communication and dialing a telephone number. A display 116 displays the characters and images representing the various operational states of the mobile telephone.

Referring to FIG. 2, the switching operation of the mobile telephone for selectively receiving or transmitting a voice signal in the speakerphone mode according to an embodiment of the present invention will be described. The microprocessor 112 determines in step 201 whether the mobile telephone has received a call. If a call is received, the microprocessor 112 generates a ring signal and sends it to the ringer 114 in step 202. Accordingly, the user, in step 203, presses a key of the key input part 118 to establish a communication channel and the microprocessor 112 establishes a single communication path between the sender and receiver.

In step 204, the microprocessor 112 determines whether the mobile telephone is set in the speakerphone mode. If so, it enables the speakerphone part 107 to make the sender and receiver communicate in the speakerphone mode. Otherwise, the microprocessor 112 proceeds to step 205 to operate the mobile telephone in the ordinary communication mode. If speakerphone mode is selected the signal level detector 122 compares the level of the voice signal from the radio receiver 102 with that from the voice signal processor 104. The signal with the greater level is delivered to the microprocessor 112.

If the voice signal from the radio receiver 102 is delivered to the microprocessor 112, the microprocessor 112 proceeds to step 206 to determine whether the received voice data is of a full-rate. This is accomplished by reading the configuration byte contained in the voice data information. Generally, a single voice data has a length of 20 ms. If the received voice data is determined to have a full-rate in step 206, the microprocessor 112 proceeds to step 207 to count the full-rate value of the received voice data. The voice data is continuously received until the counted value reaches a predetermined value, at which point the microprocessor 112 determines it to be the valid voice data. Then, if the counted full-rate value exceeds the predetermined value in step 208, the microprocessor 112 proceeds to step 210 to control the rate of the transmitted voice data from the microphone.

Each block of received voice data is checked to determine if it is at full-rate. If is it at full-rate, an accumulator, stored in the memory device 110, is increased by 1. Each time a full-rate voice data block is received the accumulator is increased by 1. The value stored in the accumulator is referred to as the counted value. If the received voice data is not of a full-rate the accumulator is decreased by a value of 1. When a full-rate signal is received, the microprocessor 112 checks if the counted value exceeds a predetermined value, signifying that the received voice signal is at a level to begin controlling the transmission rate of the mobile telephone. If the counted value does not exceed the predetermined value, the counted value, stored in the accumulator, is increased by 1, transmission is not controlled, and the process returns to check the level of the next received voice data block. This process of receiving the voice data, checking for full-rate, and increasing or decreasing the counted value continues until the predetermined value is exceeded, at which time transmission control begins. The process then returns to check the next received voice data block for full-rate.

The transmitted voice data is divided into four different rates according to the amount of the sound, e.g., full-rate, ½ rate, ¼ rate, and ⅛ rate. In addition, the voice data with no voice information is called the blank rate. In order to control the packet rate of the transmitted voice data, the value '1' is assigned to the bit of the configuration byte, representing that the voice data is presently the blank rate, while the other bits representing the other rates are all assigned with the value '0'. Thus, no changes are made to the configuration byte with the information of the voice data. When the counted value exceeds the predetermined value one of two events occur. Either the voice data is deleted from the transmitted data or the voice data is changed into ⅛ rate data to minimize the echoing effect.

Subsequently, if the communication is terminated in step 211, the microprocessor 112 cuts off the communication path between the sender and receiver, or otherwise returns to step 206. Meanwhile, if the received voice data is not of full-rate in step 206, the microprocessor 112 proceeds to step 212 to determine whether the counted value is '0'. If so, it directly proceeds to step 211. Or otherwise, it proceeds to step 213 to reduce the counted value by '1', returning to step 206. Alternatively, if the counted full-rate value does not exceed the predetermined value in step 208, it proceeds to step 209 to increase the counted value by '1', returning to step 206.

Thus, the inventive switching method in the speakerphone mode employs the full-duplex operation to enable the mobile telephone to function in speakerphone mode with no additional device. It also reduces the number of cases where the communication is interrupted in the VOX (voice operated switch) function. In addition, the voice data of one user is prevented from being transmitted in the speakerphone mode when the voice data of the other user is transmitted with the full-rate, thus preventing voice communication garbling.

While the present invention has been described in connection with specific embodiments accompanied by the attached drawings, it will be readily apparent to those skilled in the art that various changes and modifications may be made thereto without departing the gist of the present invention.

What is claimed is:

1. A method for switching a mobile telephone for selectively receiving or transmitting a voice signal in a speakerphone mode, comprising the steps of:

counting a number of received full-rate voice data blocks; and blocking the transmission path of transmitted voice data if the counted number of full-rate voice data blocks exceeds a predetermined value.

2. The method as set forth in claim 1 wherein the blocking of the transmission path is one of a complete blocking of the transmitted voice data and a reduction of the transmission rate of the transmitted voice data.

3. The method as set forth in claim 1, wherein the counting step further comprises the steps of:

increasing the counted value if the received voice data is at full-rate; and decreasing the counted value if the received voice data is not at full-rate.

4. The method as set forth in claim 2, wherein the number of the counted value is increased by and decreased by 1.

5. A method for switching a mobile telephone for selectively receiving or transmitting a voice signal in a speakerphone mode, comprising the steps of:

determining if a received voice data block is at a full-rate;

counting the number of received full-rate voice data blocks; and blocking the transmission path of transmitted voice data if the number of the full-rate voice data exceeds a predetermined value.

6. The method as set forth in claim 5, wherein the counting step further comprises the steps of:

increasing the counted value if the received voice data is at full-rate; and decreasing the counted value if the received voice data is not at full-rate.

7. The method as set forth in claim 6 wherein the number the counted value is increased by and decreased by is 1.

8. A method for switching a mobile telephone for selectively receiving or transmitting a voice signal in a speakerphone mode, comprising the steps of:

measuring the level of a received voice signal;

assigning a value to the received voice signal, said value based on whether or not the received voice signal is at full-rate;

accumulating the assigned values;

comparing the accumulated values to a predetermined value; and processing one of the received and transmitted voice signal based on the comparison.

9. The method as set forth in claim 8, wherein the assigned value is 1 if the received voice signal is at full-rate else the assigned value is 1.

10. The method as set forth in claim 8, wherein the minimum accumulated value is 0.

* * * * *